United States Patent [19]

Hayashi et al.

[11] Patent Number: 5,707,761
[45] Date of Patent: Jan. 13, 1998

[54] NICKEL POSITIVE ELECTRODE AND ALKALINE STORAGE BATTERY USING THE SAME

[75] Inventors: Kiyoshi Hayashi, Neyagawa; Katsuyuki Tomioka, Moriguchi; Nobuyasu Morishita, Fujiidera; Munehisa Ikoma, Shiki-gun, all of Japan

[73] Assignee: Matsushita Electric Industrial Co., Ltd., Osaka-fu, Japan

[21] Appl. No.: 732,186

[22] Filed: Oct. 17, 1996

[30] Foreign Application Priority Data

Oct. 24, 1995 [JP] Japan .................... 7-275336

[51] Int. Cl.⁶ .................... H01M 6/04; H01M 4/32
[52] U.S. Cl. .................... 429/206; 429/212; 429/218; 429/223; 429/231
[58] Field of Search .................... 429/206, 218, 429/223, 229, 231, 209, 215, 212; 420/900

[56] References Cited

U.S. PATENT DOCUMENTS

| | | | |
|---|---|---|---|
| 5,053,297 | 10/1991 | Yamahira et al. | 429/218 X |
| 5,350,648 | 9/1994 | Kagawa et al. | 429/218 |
| 5,395,712 | 3/1995 | Furukawa | 429/206 |

FOREIGN PATENT DOCUMENTS

| | | |
|---|---|---|
| 0 577 991 A2 | 1/1994 | European Pat. Off. . |
| 0 658 947 A1 | 6/1995 | European Pat. Off. . |
| 2 280 981 | 2/1976 | France . |
| 06 196162 | 7/1994 | Japan . |
| 391 458 | 4/1933 | United Kingdom . |

*Primary Examiner*—Anthony Skapars
*Attorney, Agent, or Firm*—Panitch Schwarze Jacobs & Nadel, P.C.

[57] ABSTRACT

An improved non-sintered type nickel positive electrode comprising a nickel hydroxide powder as an active material and a cobalt hydroxide powder for improving the utilization of the active material, and an alkaline storage battery configured with the positive electrode are disclosed. In the non-sintered type nickel positive electrode, at least part of the surfaces of the particles of the cobalt hydroxide powder is covered with a stabilizing agent of at least one member selected from the group consisting of a higher carboxylic acid, an ester of carboxylic acid, an aldehyde, a phenol and a vitamin.

11 Claims, 1 Drawing Sheet

NICKEL POSITIVE ELECTRODE AND ALKALINE STORAGE BATTERY USING THE SAME

BACKGROUND OF THE INVENTION

1. Field of the Invention

The present invention relates to a non-sintered type nickel positive electrode and an alkaline storage battery configured with this positive electrode.

2. Description of the Prior Art

Nowadays, storage batteries of various rechargeable battery systems have been applied as the power source of mobile objects such as portable equipment and electric vehicles. Of these, sealed storage batteries are widely applied because of their advantageous maintenance-free performance, and there is an increasing demand for minimized and light sealed storage batteries. Under these circumstances, attempts have been made to give a higher capacity to nickel-cadmium storage batteries and nickel-metal hydride storage batteries having a negative electrode comprising a hydrogen storage alloy, in order to realize a storage battery having a longer cycle life, higher reliability and higher safety.

In these alkaline storage batteries configured with the nickel positive electrode, a technology for realizing the use of the non-sintered type positive electrode has been developed in place of the conventional pocket-type positive electrode and sintered-type positive electrode. The non-sintered type positive electrodes use, as a substrate for supporting an active material, a foamed nickel sheet or nickel felt having a high porosity, which enabled the nickel positive electrodes to have a significantly high capacity.

Under these circumstances, a technology has been attracting attention in this art that realizes a positive electrode having a higher capacity by improving utilization of pasty active material to be loaded into the substrate.

One measure for improving the utilization of the pasty active material in the nickel positive electrode is to add cobalt or its compounds. There are various proposed methods for this; for instance, Japanese Laid-Open Patent Publication No. Sho 62-66570 discloses a method of adding cobalt hydroxide having a specific surface area of 20 $m^2/g$ or less. However, the stability of the cobalt hydroxide used in this publication is not satisfactory, and it becomes mandatory for improving the utilization of the active material in the nickel positive electrode to add a large amount of cobalt hydroxide having a small surface area. The presence of such a large amount of cobalt hydroxide in the active material, however, will make it difficult to realize a positive electrode having a high capacity.

Japanese Laid-Open Patent Publication No. Hei 6-196162 discloses a method of using formic acid as a stabilizing agent for the cobalt hydroxide. It is however known that if the formic acid, one of lower carboxylic acids, remains in the positive electrode after it is configured into a battery, it would deteriorate the performance of the battery. This method therefore suffers from a disadvantage that the formic acid must be removed by a heat-treatment.

As described previously, the known methods for adding cobalt hydroxide have the disadvantages and are not satisfactory.

SUMMARY OF THE INVENTION

In order to improve the utilization of the nickel positive electrode active material, the present invention intends to overcome and solve the above-mentioned disadvantageous problems of the prior art method of adding cobalt. Therefore, the primary objects of the present invention are to improve the utilization of the nickel positive electrode active material by addition of cobalt hydroxide in combination with a suitable stabilizing agent therefor and provide a non-sintered type nickel positive electrode having a high capacity.

Another object of the present invention is to provide an alkaline storage battery having a smaller size and a lighter weight realized by the higher capacity of the improved nickel positive electrode.

The present invention provides a non-sintered type nickel positive electrode comprising a nickel hydroxide powder and a cobalt hydroxide powder added for improving the utilization of the above-mentioned active material, wherein at least part of surfaces of the particles of the above-mentioned cobalt hydroxide powder is covered with a stabilizing agent of at least one member selected from the group consisting of a higher carboxylic acid, an ester of carboxylic acid, an aldehyde, a phenol and a vitamin.

In a preferred mode of the present invention, as the above-mentioned higher carboxylic acid, one of citric acid, tartaric acid, lactic acid and glutamic acid is suitably used.

As the ester of carboxylic acid, isoamyl acetate or methyl anthranilate is suitably used.

As the aldehyde, formaldehyde or citral is suitably used.

As the phenol, β-naphthol or tocopherol is suitably used.

As the vitamin, vitamin C (L-ascorbic acid) or vitamin E is suitably used.

It is preferable that the cobalt hydroxide powder added for improving the utilization of nickel hydroxide as the active material has a specific surface area of 10 $m^2/g$ or larger and a particle diameter of ½ or less of that of the nickel hydroxide powder.

It is also preferable that the amount of the above-mentioned stabilizing agent, which is introduced into the positive electrode with the cobalt hydroxide powder, is in a range of 0.01 to 10 mg per 1 g of the cobalt hydroxide.

The alkaline storage battery in accordance with the present invention comprises the above-defined non-sintered type positive electrode, a negative electrode configured with a hydrogen storage alloy which preferably electrochemically absorbs and desorbs hydrogen in a reversible manner, and an alkaline electrolyte.

While the novel features of the invention are set forth particularly in the appended claims, the invention, both as to organization and content, will be better understood and appreciated, along with other objects and features thereof, from the following detailed description taken in conjunction with the drawing.

DETAILED DESCRIPTION OF THE PREFERRED EMBODIMENTS

Figure 1:
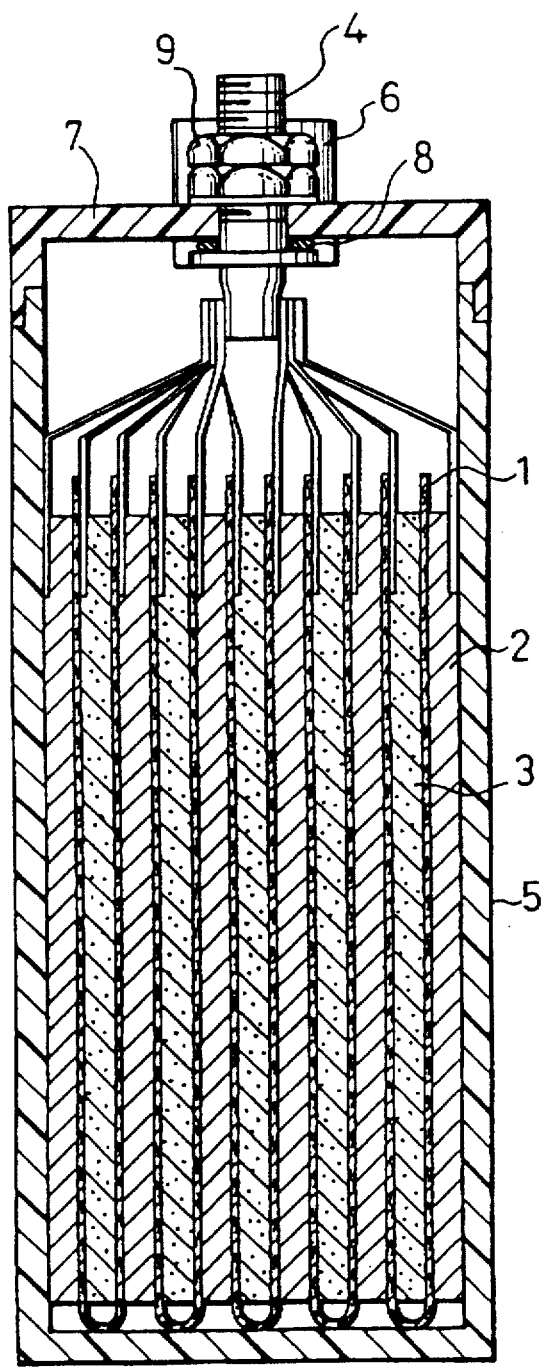
FIG.1 is a longitudinal cross-sectional view showing a sealed alkaline storage battery in accordance with an embodiment of the present invention.

The present invention is directed to a non-sintered type nickel positive electrode comprising a nickel hydroxide powder added with a cobalt hydroxide powder, at least part of the surfaces of the particles of which is covered with the above-mentioned stabilizing agent represented by the higher carboxylic acids.

The non-sintered type nickel positive electrode referred to herein comprises not only a nickel electrode prepared by loading an active material mixture including the above-mentioned cobalt hydroxide powder into a foamed nickel sheet or felt composed of a nickel fiber having a high porosity as a substrate for supporting an active material but also another nickel electrode prepared by coating an active material mixture on both surfaces of a substrate made of punched or perforated plate.

Among the above-defined stabilizing agents, citric acid, isoamyl acetate, citral, β-naphthol and vitamin C are particularly preferable.

There are two methods to cover at least part of the surfaces of the particles of the cobalt hydroxide powder; that is, 1) to immerse the cobalt hydroxide powder in a solution of preferably an aqueous solution of the stabilizing agent, followed by drying, and 2) to spray a solution of the stabilizing agent on the surface of cobalt hydroxide, followed by drying. If the stabilizing agent is water-insoluble, like vitamin E, it is dissolved in methanol at use.

By treating the cobalt hydroxide with the stabilizing agent in the above-mentioned manner, it is possible to handle the readily oxidizable cobalt hydroxide in its stabilized state because the cobalt hydroxide is blocked and loses its contact with oxygen. Even if the cobalt hydroxide is covered with the stabilizing agent, an oxidizing reaction for producing an effective CoOOH in the nickel positive electrode is not hindered by the covering.

The surfaces of the particles of the thus treated cobalt hydroxide are covered with an organic compound as the stabilizing agent. When the cobalt hydroxide is mixed with the nickel hydroxide powder and made into a paste using water to prepare a nickel positive electrode, the hydrophobic property of the organic compound facilitates satisfactory dispersion of the fine particles of the cobalt hydroxide powder in the nickel positive electrode. This helps to form an electrically conductive network of CoOOH, which is a known effect of CoOOH, in the nickel positive electrode, with the use of a small amount of cobalt hydroxide compared with the conventional method.

In addition, as the stabilizing agent employed in the present invention has no harmful influence on the battery performance even if it remains in the battery, a non-sintered type nickel positive electrode having a high capacity can be produced.

In addition to the previously described cobalt hydroxide, the active material mixture may further include a suitable amount of at least one member selected from the group consisting of metallic nickel powder, carbon powder, metallic cobalt powder and cobalt monoxide powder. By this inclusion, a further advantage is expected in improving the utilization of the active material.

The active material mixture may further include at least one member selected from the group consisting of zinc oxide powder, cadmium oxide powder, metallic zinc powder and metallic cadmium powder. By this inclusion, the utilization of the active material at a high temperature is improved.

It is preferable to conduct an initial charging of the alkaline storage battery in accordance with the present invention after assembling, with a theoretical quantity of electricity for oxidizing Co (II) of the cobalt hydroxide and metallic cobalt contained in the nickel positive electrode to Co (III) at a current of ½ CA or less, calculated on a basis of the above-mentioned theoretical quantity of electricity.

It is also preferable to perform its initial charging after assembling, with a theoretical quantity of electricity for oxidizing Co (II) of the cobalt hydroxide and metallic cobalt contained in the nickel positive electrode to Co (III) at a current of ½ CA or less, calculated on a basis of the above-mentioned theoretical quantity of electricity, and to continue a subsequent charging at a current of ½ CA or less calculated on a basis of a theoretical capacity of the nickel hydroxide as the active material.

It is further preferable to perform its initial charging at least 10 hours after assembling.

In the following paragraphs, the present invention will be described in more detail with reference to its preferred embodiments and comparative examples.

EXAMPLE 1

Cobalt hydroxide was precipitated by adding 1.0 L of an aqueous solution of sodium hydroxide (2 mol/L) to 1.0 L of an aqueous solution of cobalt sulfate (1 mol/L), followed by vigorous stirring. The precipitate was washed with water by means of decantation, and filtered off and then dried. The cobalt hydroxide thus obtained was named "a".

Another cobalt hydroxide was obtained by immersing the water-washed precipitate of the cobalt hydroxide prepared in the previous step in 1.0 L of an aqueous solution of citric acid (1 mol/L), followed by filtering and drying. This cobalt hydroxide was named "b". Similarly, other cobalt hydroxides were prepared using aqueous solutions of isoamyl acetate (1 mol/L), citral (1 mol/L) and β-naphthol (1 mol/L), respectively, instead of citric acid and they were named "c", "d" and "e", respectively.

For confirmation of the difference in the performance of the batteries due to the difference in the quantity of the stabilizing agent remaining in the cobalt hydroxide, aqueous solutions of ascorbic acid (0.1, 0.5, 1.0, 2.0, 5.0 and 10.0 mol/L) were used in the immersing treatment (1.0 L for each), and the produced respective cobalt hydroxides were named "f", "g", "h", "i", "j" and "k". The stabilizing agent remaining in the cobalt hydroxide was extracted with chloroform and its quantity was determined by weight analysis. For confirming the stability, change in the valence of cobalt by aging after the preparation of the cobalt hydroxide was measured by iodometry. The results of these measurements are summarized in Table 1 below.

TABLE 1

| Species of cobalt (remaining stabilizing agent) | Quantity of remaining stabilizing agent (mg/g) | Valence of Cobalt Aging period (h) | | | | |
|---|---|---|---|---|---|---|
| | | 0 | 12 | 24 | 78 | 240 |
| a (none) | 0 | 2.02 | 2.10 | 2.19 | 2.41 | 2.55 |
| b (citric acid) | 0.142 | 2.01 | 2.01 | 2.02 | 2.02 | 2.01 |
| c (isoamyl acetate) | 0.258 | 2.01 | 2.02 | 2.02 | 2.01 | 2.01 |
| d (citral) | 0.166 | 2.01 | 2.01 | 2.02 | 2.02 | 2.01 |
| e (β-naphthol) | 0.299 | 2.01 | 2.02 | 2.01 | 2.01 | 2.02 |
| f (L-ascorbic acid, 0.1 mol.L) | 0.004 | 2.01 | 2.03 | 2.07 | 2.13 | 2.18 |
| g (ibid, 0.5) | 0.048 | 2.00 | 2.00 | 2.01 | 2.01 | 2.02 |
| h (ibid, 1.0) | 0.531 | 2.01 | 2.00 | 2.01 | 2.01 | 2.01 |
| i (ibid, 2.0) | 4.315 | 2.01 | 2.01 | 2.01 | 2.01 | 2.01 |
| j (ibid, 5.0) | 12.15 | 2.01 | 2.00 | 2.01 | 2.00 | 2.00 |
| k (ibid, 10.0) | 15.50 | 2.01 | 2.02 | 2.02 | 2.01 | 2.01 |

As clearly shown in Table 1, each of the cobalt hydroxides "b", "c", "d", "e", "g", "h", "i", "j" and "k" treated with citric acid, isoamyl acetate, citral, β-naphthol (1 mol/L, respectively) and L-ascorbic acid (0.5 mol/L or more), respectively, remains stable in the air for a long period of time. In contrast, the cobalt hydroxide "a" without any treatment and the cobalt hydroxide "f" treated with the aqueous solution of L-ascorbic acid (0.1 mol/L) are oxidized because the surfaces of the cobalt hydroxide particles are not satisfactorily covered with the L-ascorbic acid or the like.

Each of the cobalt hydroxide powders prepared in the above-mentioned manner was then mixed with nickel hydroxide powder in a ratio by weight of $Ni(OH)_2:Co(OH)_2=100:5$, and the obtained mixtures were added with water to obtain pastes. These pastes were loaded in each of foamed nickel sheets having a width of 60 mm, a length of 81 mm and a weight of 3.1 g, followed by drying at 80° C., and the dried sheets were pressed to have a thickness of 1.74 mm to obtain positive electrode plates. A nickel plate was spot-welded to a corner of each positive electrode plate as a lead conductor.

Separate from this, an $AB_5$-type hydrogen storage alloy represented by the formula: $MmNi_{3.55}Mn_{0.4}Al_{0.3}Co_{0.75}$ was used as a negative electrode material. Mm represents a misch metal containing lanthanum at 10 wt %. Water was added to 19.4 g of the alloy powder to produce a paste which was then loaded in the foamed nickel sheet having a width of 60 mm and a length of 81 mm and a weight of 3.1 g, followed by drying, and the dried sheet was pressed to have a thickness of 1.20 mm to obtain a negative electrode plate. A nickel plate was spot-welded to a corner of the negative electrode plate as a lead conductor.

Electrode groups were configured by laminating each 5 sheets of the positive electrode plates and each 6 sheets of the negative electrode plates, placing separators between the electrodes of opposite polarity, and sample batteries were assembled. The sample batteries configured with the respective cobalt hydroxides "a"–"k" were named Batteries A, B, C, D, E, F, G, H, I, J and K, respectively.

FIG. 1 shows the longitudinal cross-sectional view of the sample battery. As shown in the FIGURE, the electrode group is configured by laminating the negative electrodes 2 with the positive electrodes 3 enclosed in the U-shaped separators 1. This electrode group is housed in a battery casing 5 made of acrylonitrile-stylene resin having a wall thickness of 3 mm, and an inner size of a depth of 108 mm, a length of 69 mm and a width of 18 mm.

After injecting 54 ml of an electrolyte of an aqueous solution of potassium hydroxide having a specific gravity of 1.3 into the battery casing 5, the open end of the battery casing 5 is closed with a sealing plate 7 made of acrylonitrile-stylene resin by adhering the sealing plate 7 to the battery casing 5 with an epoxy resin. The sealing plate 7 is provided with a safety valve 6 which actuates at 2 atms.

As shown in the FIGURE, the lead conductor of the negative electrode 2 is connected to a negative electrode terminal 4 by spot-welding and the lead conductor of the positive electrode 3 is connected to a positive electrode terminal (not shown), respectively. The negative electrode terminal 4 and the unshown positive electrode terminal are liquid-tightly and gas-tightly provided on the sealing plate 7 with an O-ring 8 and nuts 9. The capacity of the sealed storage battery configured in this manner is restricted by the positive electrode.

These batteries were then subjected to repeated charge/discharge cycles by charging at ⅕ CA for 6 hours and discharging at ⅕ CA until the terminal voltage dropped to 1.0 V. The utilizations of the nickel hydroxide as the positive electrode active material compared with the theoretical capacity of the nickel hydroxide were derived based on the discharge capacity at the third cycle. The results are summarized in Table 2 below.

TABLE 2

| Battery | Utilization of Positive Electrode Active Material (%) |
|---|---|
| A | 82 |
| B | 98 |
| C | 96 |
| D | 97 |
| E | 96 |
| F | 85 |
| G | 92 |
| H | 95 |
| I | 96 |
| J | 97 |
| K | 88 |

As clearly shown in Table 2, the batteries configured with each of the cobalt hydroxides "b", "c", "d", "e", "g", "h", "i", "j" and "k" treated with citric acid, isoamyl acetate, citral, β-naphthol (1 mol/L, respectively) and L-ascorbic acid (0.5 mol/L or more) demonstrated a high utilization. In contrast, the cobalt hydroxide "a" without any treatment and the cobalt hydroxide "f" with insufficient treatment were oxidized before the preparation of the positive electrode plates and thus unable to demonstrate the advantage expected by the addition of the cobalt hydroxide. It is believed that the decrease in utilization of the positive electrode active material is due to the fact that the cobalt is oxidized to a higher oxide, for instance, a cobalt compound such as tricobalt tetroxide ($Co_3O_4$) which cannot produce CoOOH.

EXAMPLE 2

A nickel hydroxide powder having an average particle diameter of 10 μm and cobalt hydroxide powders, whose particle diameters were ⅒, ⅕, ⅓, ½ and 1 of the particle diameter of the nickel hydroxide powder and whose specific surface areas (determined by the BET method) were 5, 10, 30 and 100 m²/g, were separately prepared. The cobalt hydroxide powders were classified into two groups: Group J treated with L-ascorbic acid after precipitation and Group K without any treatment. Each of the cobalt hydroxide powders prepared in the above-mentioned manner was then mixed with the nickel hydroxide powder in a ratio by weight of $Ni(OH)_2:Co(OH)_2=100:5$. The positive electrodes were configured with these mixture, and then sealed batteries were produced in a manner similar to that in Example 1. These batteries were then subjected to repeated charge/discharge cycles by charging at ⅕ CA for 6 hours and discharging at ⅕ CA until the terminal voltage dropped to 1.0 V. The utilizations of the nickel hydroxide as the positive electrode active material compared with the theoretical capacity thereof were measured. The results are summarized in Table 3 below.

TABLE 3

| | | Utilization of Positive Electrode Active Material (%) | | | |
|---|---|---|---|---|---|
| Ascorbic acid Treatment | Particle Diameter Ratio of Cobalt hydroxide to Nickel hydroxide | Specific Surface Area of Cobalt hydroxide (m²/g) | | | |
| | | 5 | 10 | 30 | 100 |
| Group J | 1/10 | 87 | 98 | 99 | 99 |
| | 1/5 | 85 | 97 | 98 | 99 |
| | 1/3 | 83 | 97 | 97 | 98 |

TABLE 3-continued

Utilization of Positive Electrode Active Material (%)

| Ascorbic acid Treatment | Particle Diameter Ratio of Cobalt hydroxide to Nickel hydroxide | Specific Surface Area of Cobalt hydroxide (m²/g) | | | |
|---|---|---|---|---|---|
| | | 5 | 10 | 30 | 100 |
| Group K | 1/2 | 75 | 95 | 95 | 96 |
| | 1 | 55 | 72 | 82 | 85 |
| | 1/10 | 87 | 87 | 86 | 88 |
| | 1/5 | 85 | 87 | 86 | 87 |
| | 1/3 | 83 | 87 | 87 | 85 |
| | 1/2 | 75 | 85 | 83 | 86 |
| | 1 | 55 | 72 | 82 | 85 |

Based on the results shown in Table 3, it is appreciated that a high utilization of the nickel positive electrode active material is demonstrated in each of the cobalt hydroxide powders whose specific surface areas are 10 m²/g or larger and whose particle diameters are ½ or smaller of the particle diameter of the nickel hydroxide of Group J. In contrast, no improvement in the utilization of the positive electrode active material is observed in any of the cobalt hydroxides of Group K. This may be because the cobalt hydroxides are presumably oxidized by the air, and do not contribute to the improvement in the utilization of the positive electrode active material.

Such cobalt hydroxide powders having a large particle diameter and a small specific surface area appear less effective relatively because although they are stable in the air, it is necessary to add them in a larger quantity in order to improve the utilization of the nickel positive electrode active material.

EXAMPLE 3

Nickel hydroxide powder was mixed with the cobalt hydroxide powder treated with L-ascorbic acid and metal cobalt powder in a ratio by weight of Ni(OH)₂:Co(OH)₂:Co =100:5:5, and the obtained mixture was added with water to prepare a paste. The positive electrode plate was configured with the paste, and then a sealed battery was produced with this positive electrode in a manner similar to that in Example 1. In the production, the capacity of the positive electrode per one cell of the battery was adjusted to 25.1 Ah and the quantity of electricity required for converting the added cobalt hydroxide and metallic cobalt to valence III was adjusted to 7.5 Ah.

The batteries were then subjected to an initial charging at one of the charging currents of 2.5, 3.75, 7.5 and 15 A, corresponding to each of ⅓, ½, 1 and 2 CA calculated on a basis of a theoretical quantity of electricity (Ah) for oxidizing Co (II) in the cobalt compounds contained in the positive electrode to Co (III). The charged electricity quantity amounted to the quantity required for oxidizing the Co (II) to Co (III). Then, these batteries were charged for 6 hours at ⅕ CA calculated on a basis of a theoretical capacity of the nickel hydroxide.

Subsequently, they are subjected to charge/discharge cycles under the same conditions as applied in Example 1, that is, charging at ⅕ CA of the theoretical capacity of the nickel hydroxide and discharging at ⅕ CA until the terminal voltage dropped to 1 V and the utilization of the nickel hydroxide as the positive electrode active material, compared with its theoretical capacity was measured. The utilizations of the nickel hydroxide as the positive electrode active material are summarized in Table 4 below.

TABLE 4

| Initial Charging Current (CA) | Utilization of Positive Electrode Active Material (%) |
|---|---|
| ⅓ | 100 |
| ½ | 99 |
| 1 | 91 |
| 2 | 84 |

As shown in Table 4, the utilization of the positive electrode active material is high when the battery is charged at a current of ½ CA or smaller at their initial charging. It is assumed that this improvement reflects the fact that the added cobalt hydroxide and the metallic cobalt are satisfactorily oxidized to CoOOH having a high conductive property, and form a highly conductive network in the nickel positive electrode.

Although no experimental result is shown, a similar technical advantage is obtained by including metallic nickel powder, carbon powder or cobalt monoxide powder in the non-sintered type nickel positive electrode. A similar technical advantage is also obtained by including zinc oxide powder, cadmium oxide powder, metallic zinc powder or metallic cadmium powder in the non-sintered type nickel positive electrode.

As described previously, according to the present invention, it is possible to provide an alkaline storage battery having a high utilization of its nickel positive electrode active material and a high capacity.

It is understood that various other alterations and modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A non-sintered positive electrode comprising a nickel hydroxide powder and a cobalt hydroxide powder, wherein at least part of surfaces of the particles of said cobalt hydroxide powder is covered with a stabilizing agent of at least one member selected from the group consisting of citric acid, tartaric acid, lactic acid, glutamic acid, an ester of carboxylic acid, an aldehyde, a phenol and a vitamin.

2. The non-sintered positive electrode in accordance with claim 1, wherein said ester of carboxylic acid is isoamyl acetate or methyl anthranilate.

3. The non-sintered positive electrode in accordance with claim 1, wherein said aldehyde is formaldehyde or citral.

4. The non-sintered positive electrode in accordance with claim 1, wherein said phenol is β-naphthol or tocopherol.

5. The non-sintered positive electrode in accordance with claim 1, wherein said vitamin is vitamin C or vitamin E.

6. The non-sintered positive electrode in accordance with claim 1, wherein said cobalt hydroxide powder has a specific surface area of 10 m²/g or larger and a particle diameter of ½ or less of that of said nickel hydroxide powder.

7. The non-sintered positive electrode in accordance with claim 1, wherein an amount of said stabilizing agent is 0.01–10 mg per 1 g of said cobalt hydroxide.

8. The non-sintered positive electrode in accordance with claim 1, further comprising at least one member selected from the group consisting of a metallic nickel powder, a carbon powder, a metallic cobalt powder and a cobalt monoxide powder.

9. The non-sintered positive electrode in accordance with claim 1, further comprising at least one member selected from the group consisting of a zinc oxide powder, a cadmium oxide powder, a metallic zinc powder and a metallic cadmium powder.

10. A sealed alkaline storage battery comprising the non-sintered positive electrode in accordance with claim 1, a negative electrode configured with a hydrogen storage alloy and an alkaline electrolyte.

11. A sealed alkaline storage batter comprising:

a non-sintered positive electrode configured with a nickel hydroxide powder and a cobalt hydroxide powder, wherein at least part of the surfaces of the particles of said cobalt hydroxide powder is covered with a stabilizing agent of at least one member selected from the group consisting of citric acid, isoamyl acetate, citral, β-naphthol and vitamin C; a negative electrode configured with a hydrogen storage alloy; and an alkaline electrolyte.

* * * * *